United States Patent [19]
Johnson et al.

[11] 3,896,458
[45] July 22, 1975

[54] AUTOMATIC EXPOSURE CONTROL SYSTEM

[75] Inventors: Bruce K. Johnson, Andover; George D. Whiteside, Lexington, both of Mass.

[73] Assignee: Polaroid Corporation, Cambridge, Mass.

[22] Filed: Aug. 5, 1974

[21] Appl. No.: 494,994

Related U.S. Application Data
[63] Continuation of Ser. No. 376,513, July 5, 1973, abandoned.

[52] U.S. Cl. .................. 354/30; 354/59; 354/230
[51] Int. Cl. ...... G03b 7/08; G03b 7/16; G03b 9/42
[58] Field of Search ........... 354/23, 26, 30, 59, 230

[56] References Cited
UNITED STATES PATENTS
3,474,713  10/1969  Mori et al. .......................... 354/31
3,570,381  3/1971  Sato ................................... 354/49

Primary Examiner—Joseph F. Peters, Jr.
Attorney, Agent, or Firm—David R. Thornton

[57] ABSTRACT

An exposure control system for photographic apparatus which functions automatically to regulate the exposure aperture and the exposure interval under ambient and flash illumination conditions. In an ambient mode of operation, the system is responsive to scene light values whereas in a flash mode operation, the system is a hybrid system responsive to both subject distance setting and to scene light values. Consequently, the light responsive portion of the system is uniquely designed for both modes, and additionally, the functional relationship between scene light responsiveness and the follow-focus arrangement is altered at intermediate subject distances to accommodate the special circumstances often encountered at these distances where reflection from the subject of interest generally contributes only a small portion of the brightness.

21 Claims, 11 Drawing Figures

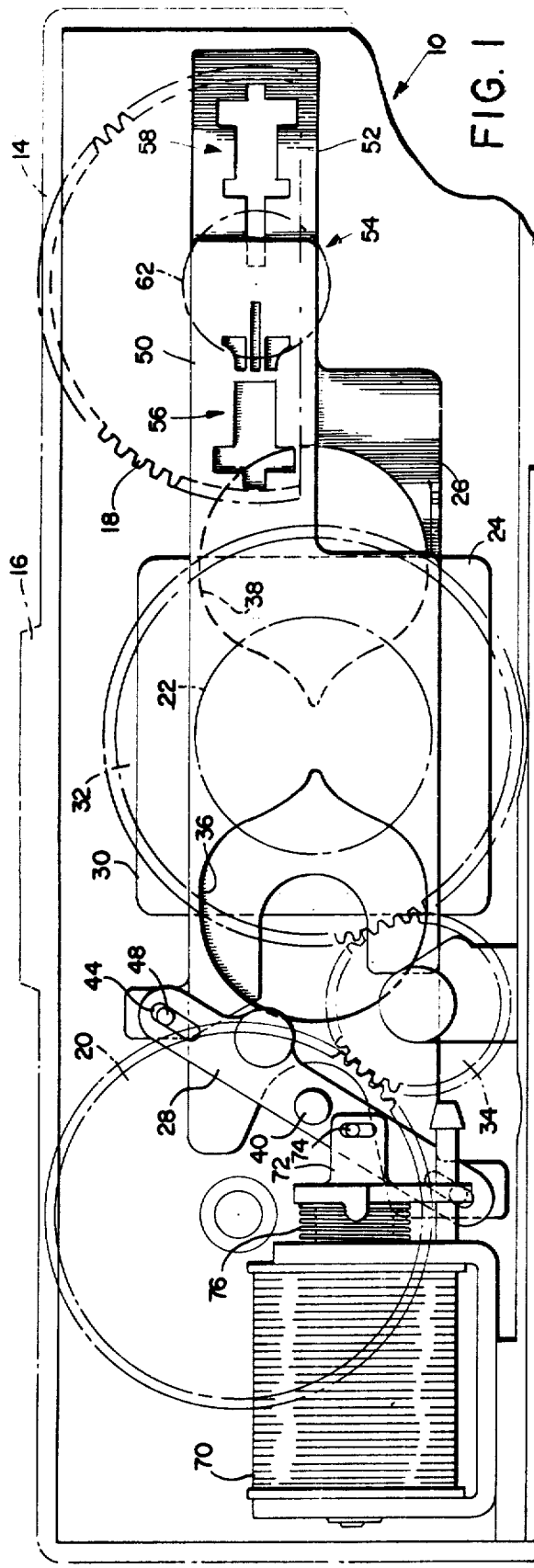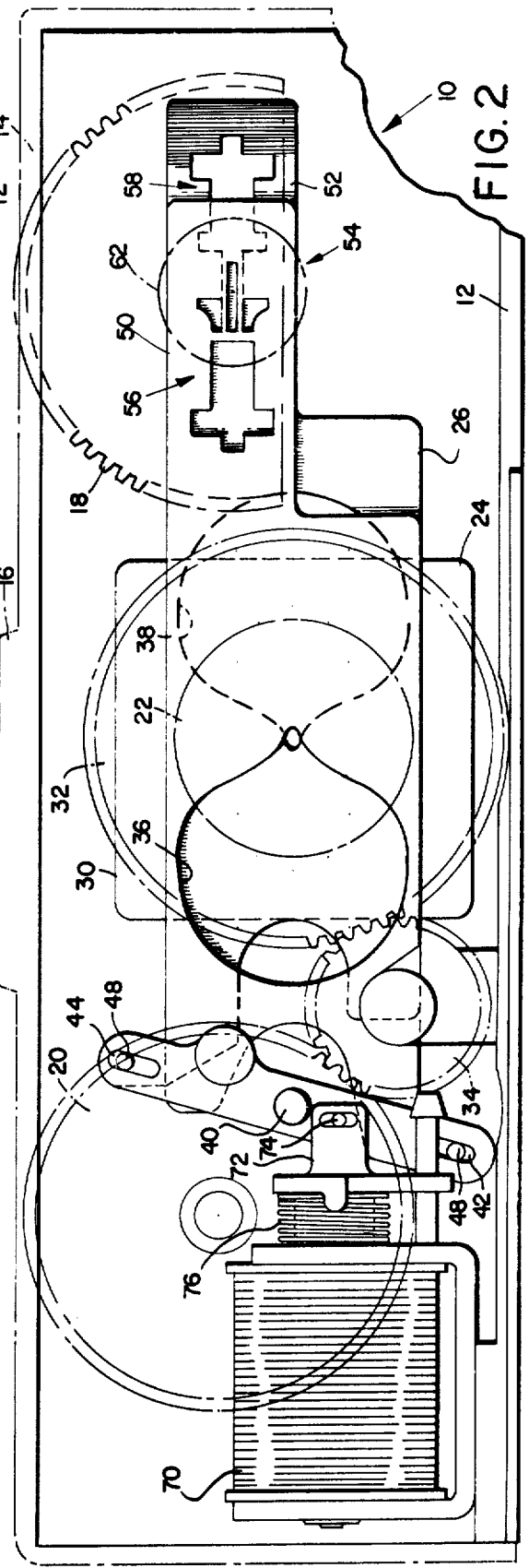

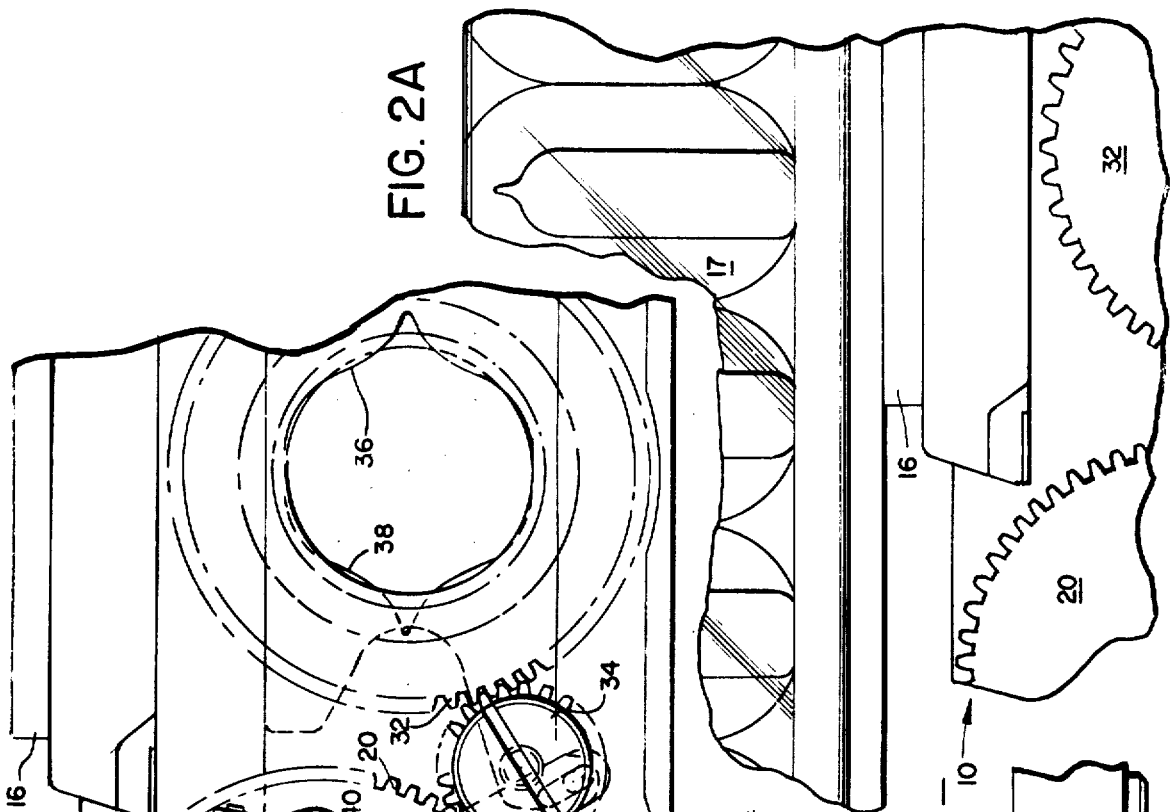

AUTOMATIC EXPOSURE CONTROL SYSTEM

CROSS REFERENCE TO RELATED APPLICATONS

This application is a continuation of U.S. application Ser. No. 376,513, filed July 15, 1973, now abandoned.

BACKGROUND OF THE INVENTION

This invention relates generally to photographic exposure control systems and, more particularly, to an exposure control system in which the exposure is automatically controlled in both ambient and flash modes to optimize the operation of the camera.

An automatic exposure control system which is responsive to both scene light and to subject distance setting is described in U.S. Pat. No. 3,464,332, issued to Davison et al on Sept. 2, 1969. In the system described in this patent, the aperture opening for emitting light to the film plane is automatically selected in accordance with the focusing of the camera. The exposure time is then controlled by a light responsive unit which is, in turn, automatically controlled by the focusing of the camera such that a unique relationship is provided between both the exposure aperture and the exposure time. Since the exposure aperture and the exposure time are automatically controlled in such a system, it is important to provide a suitable functional relationship in the shutter control mechanism to appropriately vary these parameters to compensate for anticipated light reflection from typical subjects at different subject distances. Hence, it is important to provide an exposure aperute time relationship in accordance with the subject distance and the typical scene photgraphed at that distance.

Inasmuch as it is preferable to provide ambient mode control solely in response to scene lighting and flash mode control in response to both scene lighting and subject distance, it is also important to provide a scene light responsiveness compatible to operation in both camera modes.

Consequently, it is an important object of this invention to provide an improved photographic exposure control system.

It is another primary object of this invention to provide an improved automatic exposure control system sutiable for both flash and ambient illumination.

Still another object of this invention is to provide an automatic exposure control system responsive solely to scene brightness when operated in an ambient mode and responsive to both scene brightness and lens focusing when operated in a flash mode.

A further object of this invention is to provide an automatic exposure control system having a preprogrammed relationship between aperture size and exposure time interval which is uniquely optimized for typical subjects photographed at intermediate subject distances.

SUMMARY OF THE INVENTION

In accordance with the general concept of the invention, the exposure control system, when operated in an ambient mode, automatically determines both the exposure aperture opening and the exposure interval in response to the brightness of the scene, whereas in a flash mode, the control system is hybrid which automatically selects an exposure aperture opening by means of a follow-focus mechanism in response to focusing of the system and then controls the exposure interval in response to the scene brightness. Thus, in accordance with the invention, the control system includes a light responsive unit which is compatible to both modes of operation.

In the illustrated system, shutter means are provided for varying the scene light emitted to a light responsive element as well as to the film plane. This shutter arrangement is preprogrammed so as to open an aperture or diaphragm mounted before the light responsive element at a faster rate than the main aperture which emits light into the film plane. Hence, the secondary or photocell aperture in effect leads the main aperture to permit anticipation of the actual light level of the scene for terminating the exposure interval at a proper time. For ambient mode control, the photocell aperture is designed to reach a maximum size and then is slightly reduced so as to provide suitable anticipation by the photocell during opening of the main aperture to its maximum size and a slightly reduced photocell aperture once the main aperture has achieved its maximum opening so as to provide proper response to the low light levels requiring the maximum exposure aperture.

In the illustrated embodiment, the exposure control system includes a single pair of shutter blades, each including openings designed to provide a photocell aperture and the main exposure aperture. The blade openings which form the main exposure aperture are elongated so that a maximum opening of the main aperture may be achieved and maintained while movement of the shutter blades is continued so as to vary the photocell aperture. This allows diminishing of the photocell aperture from its maximum while the maximum exposure aperture is maintained. Further, the openings providing the photocell aperture are especially configured so as to provide a relatively marked variation in the rate of opening of the photocell aperture with linear motion of the shutter blades so as to reduce the lead time of the photocell aperture for use in the flash mode at intermediate subject distances.

For these intermediate subject distances. follow-focus mechanism is designed to provide an exposure aperture design to use a relatively large portion of the flash envelope and the photocell aperture is functionally related so as to provide an exposure interval sufficient to utilize most of the flash envelope. In effect, the influence of the light sensing arrangement on the system is de-emphasized at this subject distance so as to allow the follow-focus mechanism to substantially determine the exposure operation.

BRIEF DESCRIPTION OF THE DRAWINGS

The novel features that are considered characteristic of the invention are set forth with particularly in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

FIG. 1 is a diagrammatic front elevational view of an exposure control system incorporating features of the instant invention, the view having portions broken away or removed to reveal internal structure;

FIG. 2 is a front elevational view of the exposure mechanism of FIG. 1 showing the components thereof in an orientation defining aperture openings;

FIG. 3 is a fragmentary view of the exposure system of FIG. 1 showing the follow-focus mechanism of the invention;

FIG. 3A is a fragmentary view of the system of FIG. 1 in combination with a flash array;

FIG. 4 is a fragmentary view of the portion of the mechanism revealed in FIG. 3 with portions broken away to reveal internal features;

DETAILED DESCRIPTION OF THE INVENTION

Figure 5:
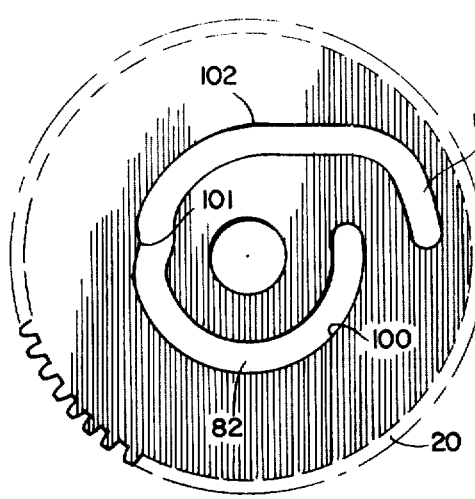
FIG. 5 is a plan view of the cam mechanism employed in the follow-focus mechanism illustrated in FIGS. 3 and 4.

Referring now to FIG. 1, it can be seen that the exposure control mechanism includes a housing 10 which comprises a rear casting 12 selectively machined to support the components of the mechanism. Surrounding the front an top of the casting 12 is a cover 14 which is structured as shown at 16 to support a packaged flashlamp array and related components and which includes openings (not shown) through which protrude manually adjustable trim and focus wheels partially shown in dotted outline at 18 and 20, respectively. Centrally disposed within the back wall of casting 12 is an exposure or light entering opening 22 which defines the maximum available exposure aperture for the mechanism.

Mounted on casting 12 are a pair of elongated blades 24 and 26 which cooperate with an interconnecting actuator or walking beam 28. The blades 24 and 26 are slidably mounted on casting 12 by means of a bracket 30 which also serves to support an externally threaded lens housing illustrated at 32. Connection between the lens assembly 32 and focus wheel 20 is provided by an idler gear shown at 34 such that rotation of the focus wheel 20 provides displacement of the lens assembly 32 for focusing of image carrying rays through the main aperture to a rearwardly position film plane (not shown) when the mechanism of FIG. 1 is employed in conjunction with a suitable film exposure chamber.

A pair of openings 36 and 38 formed in the blades 24 and 26 provide variable aperture openings in accordance wit longitudinal displacement of one blade with respect to the other responsive to movement of the walking beam 28. In this respect, it can be seen that the walking beam 28 is journaled for rotation around a stud 40 extending from rear casting 12. Elongated slots 42 and 44 formed in the distal ends of the walking beam 28 provide coupling with pins 46 and 48 fixed to and extending respectively from blades 24 and 26. Thus interconnected, the blades 24 and 26 move simultaneously with each other to define a main apertures opening of progressively varying value over the light entrance opening 22.

The blades 24 and 26 include end portions shown respectively at 50 and 52 which extend through a light detecting station 54. These end portions 50 and 52 overlie a photoelectric or light integrating unit 62 such that the openings 56 and 58 define a secondary aperture or photocell aperture of progressively varying value in accordance with movement of the blades 24 and 26. Hence, the openings 56 and 58 in combination with blade movement provide means for varying the input to the light integrating unit 62 and in conjunction with the latter, provide a light sensing means having a controllable response. The instantaneous aperture values defined by the secondary openings 56 and 58 are derived in synchronism with those aperture values provided by the openings 36 and 38.

A tractive electromagnetic device in the form of a solenoid 70 is employed to displace the shutter blades 24 and 26 with respect to each other and the casting 12. As illustrated in FIG. 1 of the drawings, the solenoid armature 72 is affixed to the walking beam 28 by means of a pin or stud 74 such that displacement of the armature 72 will rotate the walking beam 28 around its pivot pin 40 and appropriately displace the shutter blades 24 and 26. A spring member 76 surrounds the solenoid armature 72 and biases it toward the shutter blades so as to tend to bias them to an open aperture condition. This arrangement is designed for use in a reflex camera in which a normally open shutter condition facilitates viewing and focusing procedures. Consequently, in the present arrangement, the shutters are drawn to their closed position as shown in FIG. 1 only while the solenoid 70 is energized. De-energization of the solenoid 70 permits the shutter blades 24 and 26 to move toward their maximum aperture opening under the urging of the spring 76. This driving arrangement for the exposure control mechanism is described in more detail in the copending patent application, Ser. No. 349,960, now U.S. Pat. No. 3,868,712 issued Feb. 25, 1975 entitled, "Pneumatically Reactive Exposure Control System" by Conrad H. Biber, filed Apr. 11, 1973, and assigned in common herewith. It should be understood, however, that the automatic exposure control system of the invention is equally applicable to photographic systems where the blades are held in a normally closed position.

Hence, in the exposure mechanism shown in FIG. 1, the shutter blades 24 and 26 are displaced to an open aperture position, as for example as shown in FIG. 2, by de-energizing the solenoid 70 to permit the spring 76 to drive plunger 72 outwardly of the solenoid and, in turn, rotate walking beam 28 in a counterclockwise direction as viewed in FIG. 1 so as to force the aperture forming openings 36 and 38 and 56 and 58 into increasing coincidence as shown in FIG. 2. The exposure interval is then terminated by again energizing the solenoid 70 so as to retract the plunger 72 against the spring 76.

As later explained in more detail with regard to the overall operation of the exposure control system, a follow-focus mechanism 80, shown in detail in FIGS. 3 and 4, is employed in conjunction with the light unit 62 in the flash mode operation of the camera. As shown in FIGS. 3 and 4, the focus wheel 20 carries on its underside a cam track within which a cam follower 85 is located. The cam follower 85 extends from beneath the focus wheel 20 to a point where it may be utilized to engage and stop the travel of the walking beam 28. This follow-focus mechanism 80 is made effective only when a flash unit 17 is mounted on the mechanism 14 as shown in FIG. 2A. Hence, the follow-focus mechanism is energized or, that is, rendered operative by means of a solenoid designated at 84. This solenoid 84 represents the drive component of the follow-focus mechanism 80 which is described in detail and claimed in copending patent application for U.S. patent by Lawrence M. Douglas entitled, "Apparatus and System for Flash Photography," Ser. No. 168,671, filed on Aug. 3, 1971, and assigned in common herewith. This follow-focus mechanism provides mechanical coupling between the focusing wheel 20 and the walking beam 28 so as to affect the aperture adjusting feature of the exposure mechanism in accordance with focusing of the lens assembly 32, or that is, in accordance with the rotational position of the focus wheel 20. As previously indicated, the taking lens 32 and the focus wheel 20 are intercoupled by means of the interposed idler gear 34.

Referring now to FIG. 4, wherein the follow-focus mechanism 80 is shown in elevation with the focusing wheel placed at the bottom of the view, it can be seen that the cam follower comprises an arm member 86 which extends across the focus wheel 20 and carries at one end a stud 88 which is positioned within the cam track 82. At the opposite end 87 of the arm 86 from the cam following stud 88 is carried a pivotally fixed intercepter element 90. The intercepter element 90 is pivotally mounted to the arm 86 by means of a shaft member 92 and is operable in accordance with energization of the follow-focus solenoid 84 to intercept a depending stud 94 of the walking beam 28. This interception is accomplished by means of an arm member 96 which couples solenoid 84 to the intercepter member 90. A spring member 98 is employed to urge the solenoid arm 96 downwardly so as to hold the intercepter 90 in a normally inoperative position.

As later explained with regard to FIG. 9, upon insertion of a flash array 17 (shown in FIG. 2A), the exposure control system is automatically programmed for flash mode operation which includes automatic energization of solenoid 84 and, hence, operation of the follow-focus mechanism 80, responsive to operation of the exposure system. That is, the solenoid 84 is energized to draw the extended arm 96 away from the focus wheel 20 and, in turn, pivot the intercepter 90 into the path of the walking beam stud 94 so as to arrest the movement of the walking beam and to select the exposure aperture to be employed during that exposure cycle. The precise location of the blades at which this interception will occur is, of course, related to the rotational focus position of the wheel 20.

As later explained in detail ith regard to FIG. 6, the follow-focus mechanism 80 is designed to provide a unique variation in the position of the intercepter link versus the rotation of the focus wheel 20. This is accomplished by means of a unique cam track configuration which is shown in more detail in FIG. 5. As shown in FIG. 5, the cam track 82 has essentially three different camming surfaces or angles. A first of such camming surfaces indicated at 100 represents the shortest focal distances for which the exposure mechanism may be arranged. That is, when the lens 32 is rotated to position for short focal distances, the follow-focus stud 88 is positioned within the cam track at about the portion designated as 100. Rotation of the focus wheel in a counterclockwise direction, as viewed in FIG. 5, which moves the lens 34 to a larger subject distance setting, displaces the intercepter 90 as proportionate distance away from its initial location. As the focus wheel 20 is further rotated to, for example, provide a focal distance of 4', the stud 88 enters an intermediate point designated at 101 between the first cam angle 100 and the second cam angle 102. At this point, the intercepter 90 begins to move along a different curve with respect to the initial rate of change originally determined by surface 100. As the focus wheel 20 is then rotated to provide a lens position for large subject-to-lens distances, for example 10' to infinity, the cam stud 88 enters the third cam angle 103 which provides only slight further movement of the intercepter. This camming arrangemnt provides a different rate of change of the intercepter location at intermediate subject distances, for example, at and about 4', so as to alter the relationship between the aperture setting and the photocell control as explained in detail with regard to FIG. 6.

Prior to completing the description of the hybrid control, the ambient mode operation will be explained. In the operation of the exposure control system, the follow-focus mechanism is disabled during ambient mode operation. That is, as later explained with regard to FIG. 9, when a flash array is not mounted on the exposure control system, the follow-focus is inoperative and the exposure control system functions solely under the control of the light detecting station 54. In this arrangement, once the viewing mode has been completed and the exposure chamber (not shown) is prepared for exposrue (the shutter control solenoid 70 is energized to drive the blades 24 and 26 to their closed position as shown in FIG. 1), the exposure interval is initated by de-energizing the solenoid 70 to thereby release the shutter blades so as to determine progressively enlarging apertures over both the exposure opening 22 and the photocell 62. During this exposure interval, the photocell 62 receives increasing amounts of scene light due to its progressively enlarging aperture until it receives a total amount of light equal to a previously programmed value which initiates termination of the exposure interval. This termination is brought about by a signal to the exposure mechanism which again energizes solenoid 70 to reclose the blades 24 and 26.

In the ambient mode, since the intercepter 90 is not positioned for interception, both the size of the main aperture and the photocell aperture are progressively enlarged until a close command is received. The opening rates of both apertures will be described with regard to FIG. 7. As shown in this figure, the photocell aperture begins to open prior to the opening of the main aperture. That is, in the illustrated embodiment, the blade openings generally designated at 56 and 58 which define the photocell aperture are more closely spaced than the opening 36 and 38 which determine the main aperture.

Figure 7:
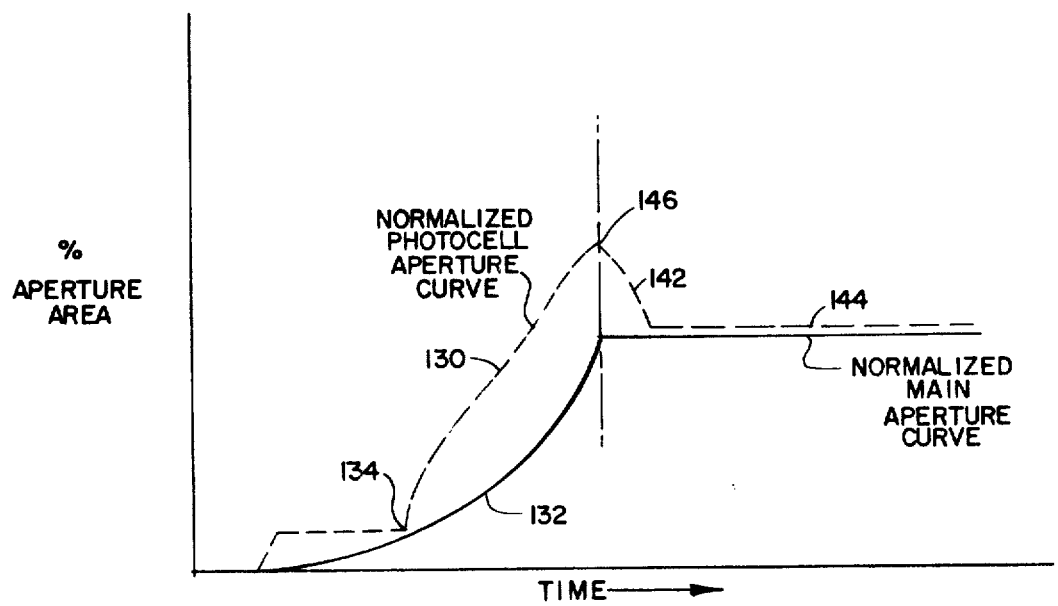
FIG. 7 is a graph illustrating the opening rates of both the main aperture and the photocell aperture responsive to displacement of the shutter mechanism shown in FIG. 1.

The secondary photocell aperture defined by opening 56 and 58 produce a curve as depicted in FIG. 7 at 130 when the shutters are driven from a closed position to a full open position. Likewsie, the primary on main exposure aperture also defines a curve as depicted at 132. In this figure, the curves are normalized, that is, a normalized photocell area can be defined as one which provides a correct exposure interval for a scene brightness where a long exposure time is employed; hence, opening and closing times become neglible. The final photocell aperture shown in this figure represents this normalized area.

As can be seen, the photocell aperture leads the main aperture, that is, opens at a faster rate relative to its full open position than does the main aperture. This leading initially occurs because the openings 56 and 58 of the shutter blades are relatively close together and begin to overlap sooner than the main aperture defining openings 36 and 38 when the blades are displaced relative to each other in a direction to open the shutter. This lead time is employed in the ambient mode so that the light integrating unit can provide an adequate anticipation of, or brightness sample related to, the total amount of light passing through the main aperture by the time the blades are closed, and thus takes into account solenoid reaction time and the blade closing time. Rather than following a smooth curve of increasing lead time, the rate at which the photocell aperture is progresively enlarged is varied, for example, reduced as at 134 during the early stages of shutter opening so as to provide a quite unique relationship between the primary aperture setting and the main aperture setting when the exposure control system is used in a flash exposure mode as later explained in detail. In the ambient mode, this sharp reduction in lead time produces a somewhat longer exposure interval than desired for very bright scenes, such as beach scenes; however, such error can be easily corrected by trim control and is easily tolerated in order to provide greatly enhanced flash mode operation.

In ambient operation of the device, the shutter blades are displaced, in accordance with de-energization of solenoid 70, so as to begin opening both apertures. In such an arrangement, the shutter blades will open until a command signal is received from the light integrating network which energizes solenoid 70 and the shutter blades are closed.

Figure 10:
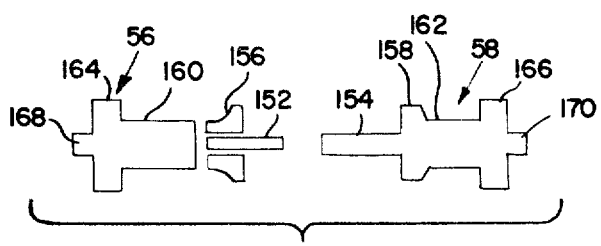
FIG. 10 is a plan view of the blade openings employed to provide the photocell aperture in the shutter mechanism illustrated in FIG. 1.

For low ambient light conditions, the system is designed to provide a maximum main aperture (designated at 142) which is determined by open 22. Preferably, the photocell opening is also configured to reach a maximum designated at 146 at that time so as to provide an appropriate exposure time interval for the flash mode, as later explained. For ambient, it is preferred that the photocell aperture than decrease to the normalized area shown at 144. Hence, the shutter blade openings 36 and 38 exceed the area of opening 22 and are elongated so as to permit further displacement of the blades in an opening direction without reducing the maximum aperture determined by the opening 22. This further displacement of the shutter blades, in accordance with the configuration of openings 56 and 58, as later explained with regard to FIG. 10, provides a reduction in the photocell aperture opening for ambient mode control. That is, at low light levels, the light integrating network will permit a long exposure time such that the main aperture will reach its maximum opening indicated at 142 in FIG. 7. When this maximum value 142 of the main aperture is achieved in an ambient mode, it is desirable that the photocell apertures have a value corresponding to that shown at 144. This level is less than the maximum photocell aperture designated at 146. Hence, in the ambient mode, the photocell aperture is allowed to peak simultaneously with the main aperture and then to decrease to its final size as indicated at 144. On the other hand, in the flash mode, the blades will be stopped by the follow-focus mechanism at a point of maximum of both apertures.

In the flash mode, the exposure control system operates as a hybrid system which depends for exposure control both on a follow-focus arrangement and a light integrating network. That is, in the flash mode, the exposure aperture is determined by the follow-focus mechanism whereas the exposure interval is determined by the light integrating arrangement. As in the ambient mode, the camera is prepared for an exposure cycle, for example, the exposure chamber is readied to receive light to the film through the main shutter; a suitable arrangement for providing overall operation of the camera is shown and described in detail in the commonly assigned copending application for U.S. Pat. Ser. No. 333,331 entitled "Flash Photographic Control System," filed Feb. 16, 1973. In the camera of the above noted arrangement, upon triggering of the camera actuator to provide an exposure, a mirror not shown herein is displaced from a viewing position to a position blocking the light path to the viewfinder such that the exposure chamber is then ready for film exposure through the main aperture. Further, just prior to displacement of the mirror to its film exposure position, the solenoid 70 is energized such that the shutter blades are driven to their closed position. At this point in the overall sequence of the camera system, the exposure control system is automatically triggered to operate through an exposure sequence as later explained in more detail with respect to FIG. 9. In such an exposure sequence in the flash mode, timing signals are generated to energize the follow-focus mechanism, open the shutter and to energize the light integrating arrangement. After a suitable delay to permit the shutter blades 24 and 26 to reach their selected aperture as determined by the follow-focus intercepter, a flash bulb is fired. At this time, the light integrating unit 62 is operative such that upon receiving a sufficient total amount of light, it energizes solenoid 70 to close the shutter blades 24 and 26.

Figure 9:
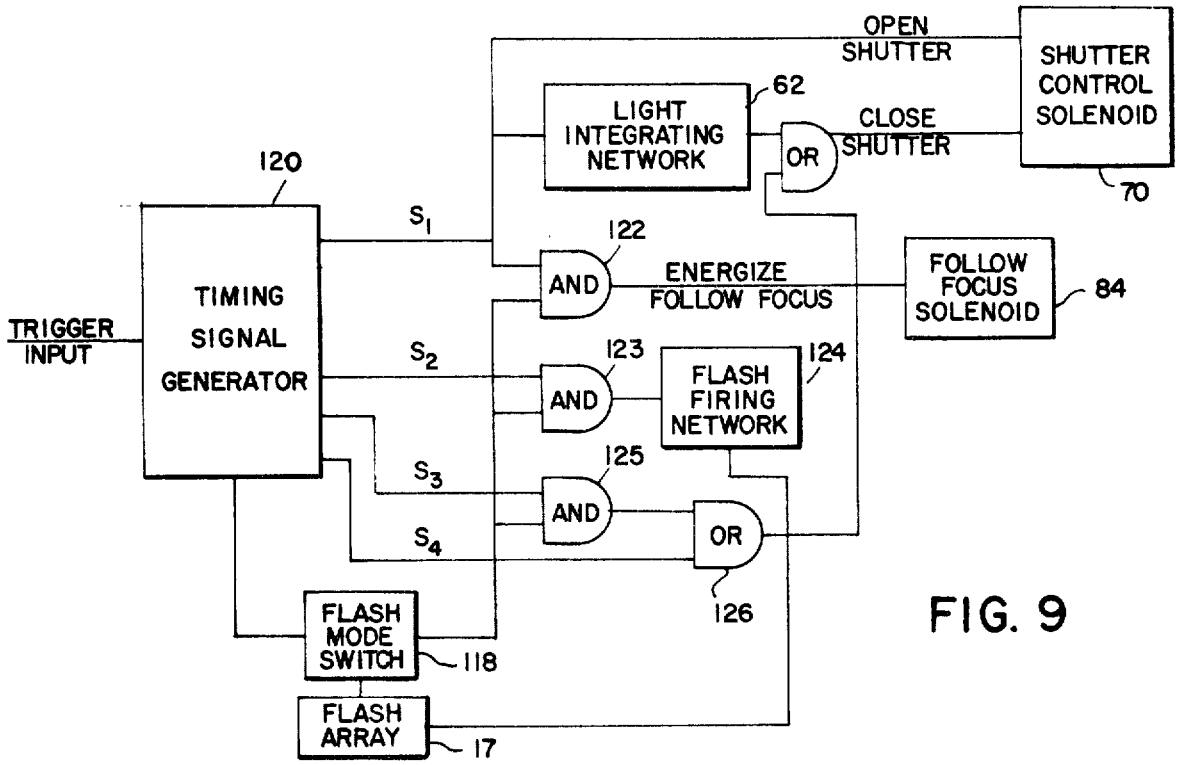
FIG. 9 is a block diagram showing the functional components and circuit interrelationships of a control system utilized in the mechanism shown in FIGS. 1 and 2.

Referring now to FIG. 9 wherein a typical exposure control system is shown in block diagram, it should be noted that the system will employ a timing signal generator or other means for providing a sequence of timing signals to control the various elements employed in the exposure system. Following the preparation of the exposure chamber (not shown) to expose a film sheet (not shown), a trigger signal is delivered to a timing signal generator designated at 120 which may, for example, take the form of a clock and decoder network, to provide appropriately timed pulses for controlling the element of the exposure control system. This signal generator 120 emits a first signal designated S1 which de-energizes shutter control solenoid 70 to open the shutter and energizes light integrating network 62 to begin evaluating scene lighting. This signal S1 is also delivered to a first AND gate designated at 122 which appropriately energizes the follow-focus solenoid 84 assuming flash array 17 has been plugged into the flash mode switch 118. This energization of the follow-focus solenoid 84 must take place just prior to or simultaneously with the initial start of opening of the shutter blades 26 and 28. That is, it should be understood that the follow-focus intercepter 90 should be out of the path of the walking beam 28 during closing of the shutter from its viewing mode position. Then, just prior to the walking beam 28 reaching the chosen position to the intercepter, the intercepter must be again displaced into the walking beam path. Once the follow-focus solenoid 84 has been energized and the shutter then driven open, the selected apertures will be defined by engagement of the walking beam 28 with the intercepter element 90. After an appropriate time to allow the blades to reach their selected apertures, the signal generator 120 then provides a second signal designated S2 which, through an "AND" gate 123, triggers a flash array 17 by means of a flash firing network 124. A suitable flash firing network is shown and described in the above noted application, Ser. No. 333,331.

As the flash fires, the light integrating network 62 will receive increased light energy which, under normal flash conditions, will provide an adequate output from the light integrating network 62 to close the shutter or, that is, to energize control solenoid 70. This terminating of the exposure cycle by means of the light integrating network 62 should occur prior to any further signals being emitted by the timing signal generator. However, assuming the light energy of a given flash is unusually low or fails to fire such that the light integrating network 62 does not receive sufficient scene light to produce a shutter closing signal, within an appropriate period of time, the shutters are closed since the timing signal generator 120 produces a third signal designated at S3 which is timed to occur at the completion of the flashing. This signal S3 is fed to a third "AND" gate 125 and then to an "OR" gate 126 to close the shutter. Hence, assuming scene light is insufficient to drive the light integrating network 62 to its trigger value, the timing signal generator S3 produces a signal to close the shutter as if the exposure control system were operating in a pure follow-focus mode. Additionally, the timing signal generator 120 produces a final signal designated at S4, approximately 25 milliseconds after the origins of signal S1, which also is configured to close the shutter through "OR" gate 126 so as to provide a safety factor assuming the shutter mechanism has failed to receive either the signal from the light integrating network 62 or the S3 signal. It should also be noted that those signals which energize the solenoid 70 to close the shutter can also be employed to reset the camera to a viewing mode.

It should be noted that the timing signal generator 120 is configured to provide the signals S1-S4 automatically in either the ambient or the flash mode of operation. In the ambient mode of operation, however, since the flash mode switch 118 is not rended on by plugging in the flash array 17, the S2 and S3 signals have no effect since their appropriate "AND" gates 123 and 125 do not receive a signal from the flash mode switch 118. Further, the follow-focus solenoid 84 would also not be energized by the S1 signal since its "AND" gate 122 also fails to receive a signal from the flash mode switch 118.

In the flash operation, the shutter blades are displaced in accordance with the S1 signal to provide a suitable exposure aperture which is determined by the follow-focus mechanism 80 in accordance with the selected subject-to-lens distance or lens focus. Assuming for the moment that the focus has been set for a close subject distance, for example, in the order of 10', an appropriate small aperture size is determined by the intercepter 90. In this arrangement, the shutter blades will open until the selected main aperture size is reached, at which time movment of the shutter blades is arrested and the selected aperture is retained until the shutter blades are closed. When the selected main aperture is reached, the photocell aperture will also have achieved a selected size or opening which is related to the selected opening of the main aperture so as to provide a suitable exposure interval which will be terminated at some point during the interval of flash illumination. That is, the light unit 62 will receive sufficient illumination so as to provide a closing signal to displace the shutter blades 24 and 26 to their closed position. Similar arrangements occur at each point along the shutter opening curves shown in FIG. 7 so as to provide a particular main aperture opening and a related photocell aperture opening for each subject distance.

To fully describe the hybrid system, it is necessary to understand the unique relationship provided in the novel system between the control of the exposure aperture and the control of the light integrating unit.

As previously indicated with respect to FIG. 5, the follow-focus mechanism 80 is designed to provide a variation in aperture size which is uniquely related to the subject distance and the special circumstances often encounter at intermediate focusing distances. In keeping with this unique follow-focus control, the photocell aperture is also especially configured, as later discussed in detail with respect to FIG. 10, to provide a unique photocell aperture for each selected follow-focus aperture.

Figure 6:
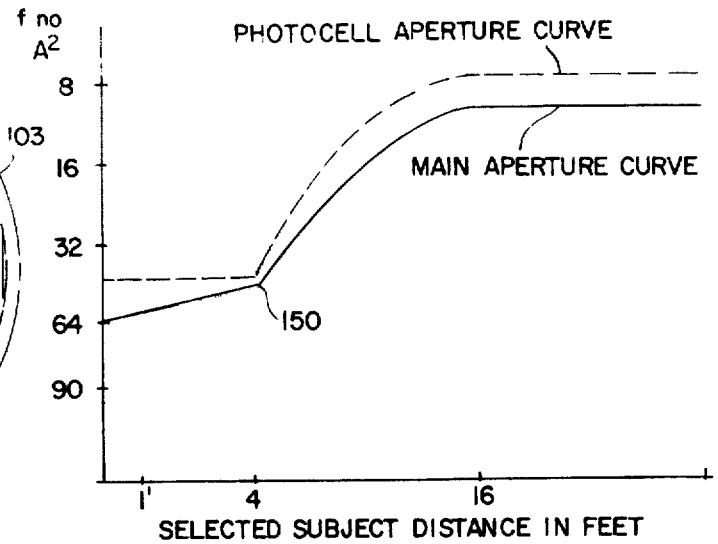
FIG. 6 is a graph illustrating the relationship of the exposure interval versus selected subject distances when the system is operated in a flash mode.

Referring now to FIG. 6, it can be seen that the opening provided by the photocell aperture and the main aperture are varied radically over the subject distance. That is, in contrast to conventional hybrid systems which generally employ rather smooth aperture curves between the minimum and maximum apertures achieved. This variation with selected subject distance is a function of the relative configurations of the aperture defining openings and the follow-focus mechanism which is functionally related to the cam track 82 of the focus wheel 20. It should be particularly noted that the configuration of the openings providing the main aperture and the openings providing the photocell aperture are varied in the direction of travel of the shutter blades so as to provide a change of one curve with respect to the other. It can be seen, by referring to FIG. 6, that both aperture settings from 1' to approximately 4' initially gradually increase in size. This corresponds to the first cam surface 100 (shown in FIG. 5). At or about the 4' point, as designated at 150 in FIG. 6, the aperture curve abruptly changes to provide rapidly increasing aperture sizes (as the cam follows cam surface 102) up to a selected subject distance of approximately 8'. Beyond this point (as the cam follows cam surface 103), the aperture curve tends to level off to provide substantially full open aperture. The photocell aperture curve follows a substantially similar path. However, it should be noted that the photocell aperture curve approaches the main aperture curve at the 4' point so as to provide a unique control at this selected subject distance.

The relationship between the photocell aperture and the main aperture is vaired for intermediate subject distances, around 4', to accommodate special circumstances which are often encountered at these subject distances. At a subject distance of 4', the subject, for example, a person, provides relatively low reflection of the flash illumination such that if the photocell curve was not compensated, overexposure of the subject may result. For example, assuming proper focus setting is made, and the photocell aperture is of proper size to provide a proper exposure interval with a normal scene, if the subject is not large enough to have a significant effect on the reflectivity of the flash illumination, the subject could receive to much illumination while the photocell waits to provide full exposure of background areas. However, for such photographs, the subject itself is usually the most important aspect of the photographed area. Stated otherwise, at these intermediate distances, the subject is often not large enough to significantly influence the reflected brightness so as to clearly influence the amount of light seen by the photocell. This follows from the fact that the hybrid system is sensitive to the scene variation since it is dependent upon the brightness of the scene.

Consequently, for intermediate distances, the comparative size of the main aperture and the photocell aperture deviates from a conventional hybrid relationship and the lead time of the photocell aperture is decreased so as to provide a relatively long exposure interval which will utilize a large portion of the flash illumination interval. In such an arrangement, if an error has been made which would tend to overexpose the photograph, and particularly the subject, the light integrating network will increase the exposure interval, however, since substantially all of the flash interval is intended to be utilized, little increase in exposure can be achieved. Hence, while the hybrid arrangement of the invention de-emphasizes the light responsive control and provides substantially follow-focus control at the intermediate distances, and thereby to reduce the sensitivity to scene variation, it nevertheless still operates to provide a vernier control on the follow-focus setting.

For close subject distances, the subject generally provides a significant amount of reflected light so as to have a relatively large influence on the amount of light seen by the photocell so that the subject is automatically exposed in relation to its own reflectivity and the exposure is optimized.

For larger subject distances, e.g., over 7', the subject is relatively small with respect to the field of view and the background becomes more influential as regards scene brightness. Additionally, the ambient light existing also becomes more important since at the large distance, the flash illumination is often diminished. These factors combine to provide a proper exposure for these large distances.

In the flash mode, both the apertures open to a selected value (determined by the follow-focus unit) before the flash is fired. The aperture selected for focus settings other than intermediate or far settings are much larger than would be normally employed in pure follow-focus so that the photoelectric control exerts a large influence over the exposure. That is, at close-up distances of 10'', and at moderate distances of, for example 7', the apertures are larger than that desired when utilizing the full flash interval such that as can be seen from FIG. 8, under normal circumstances a small portion of the flash interval is used and the photoelectric control may vary the exposure by shifting the shutter command close signal in time so as to use more or less of the flash interval.

On the other hand, at an intermediate distance, the selected main aperture is approximately equal to a conventional aperture designed in regard to the flash energy available and the film sensitivity, etc., for pure follow-focus where all of the flash interval is employed. In the illustrated embodiment, the selected main aperture is slightly larger than the indicated conventional aperture so that only approximately 95 percent of the flash envelope need be employed when the system is properly focused for the correct subject distance and with usual subjects. This permits a possible reduction in exposure (due to the photoelectric control) but only a slight increase in exposure at this selected focus setting as previously explained.

Of course, for far distances, around 20' and over, the aperture is at its maximum since it is expected that under normal circumstances the photograph needs all the available flash energy.

Hence, it should be understood that the shutter blades form selectively operable aperture means for blocking and unblocking the exposure path, for providing a unique relation between the exposure aperture size and the response to scene brightness, and for altering this functional relationship at intermediate focus distances in the flash mode so as to provide longer exposure intervals at this distance than are provided for slightly smaller or longer selected focus distances. In the illustrated embodiment, the relation between the two parameters is provided by the aperture configuration, however, the response of the light integrating unit could be varied by other means such as electronically.

Figure 8:
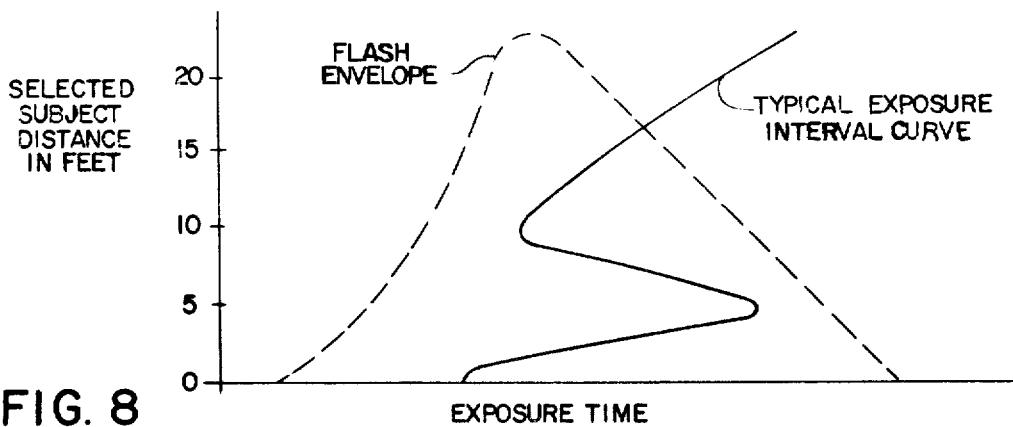
FIG. 8 is a graph illustrating the expected exposure interval for different subject distances during flash mode operation.

In FIG. 8, the expected exposure time or exposure interval is plotted versus the subject distance in feet so as to illustrate the programmed variation in this parameter. This exposure interval curve is a function of the exposure setting derived at each selected subject distance. As can be seen, when the camera is focused for close distances, that is, less than 4', the exposure interval is rather short and only utilizes a relatively small portion of the flash illumination interval. At the 4' selection point, the comparative differences between the apertures is reduced and the lead time reduced such that the command signal derived from the light integrating unit will utilize substantially all of the flush illumination interval. The exposure interval is shortened as the system is focused for distances between 4' and 8' and then lengthened over 10'. This means that the command signal expected from the light integrating unit under normal scene conditions for near subject distances will generally utilize only a small portion of the flash interval, yet at intermediate distances, it will utilize a significant portion of the flash illumination interval and then again at further distances, for example, exceeding 8', the exposure interval will be rapidly increased with selected subject distance.

In FIG. 10, the uniquely configured blade openings which define the photocell aperture are shown in detail. As can be seen from this figure, each of the openings 56 and 58 include relatively narrow, leading portions designated at 152 and 154, respectively. It can be seen that portion 154 is wider than portion 152. In this arrangement, the opening 152 is relatively narrow, for example, in the order of 0.008'' and to accommodate tolerances in the blades and the movement thereof, the leading portion 158 of the opening 58 is made wider so as to always overlap portion 152 during initial opening of the shutter blades. Following each of these leading portions 152 and 154 are relatively wide openings, designated at 156 and 158, respectively, which provide abrupt steps from the narrow leading portions. Proceeding further along both openings 56 and 58 from the indicated leading ends thereof, intermediate portions 160 and 162, respectively, are next encountered. These intermediate portions 160 and 162, while wider than the leading portions 152 and 154, are narrower than the second portions 156 and 158. Proceeding still further away from the leading end portions 152 and 154, the widest opening portions, designated at 164 and 166 respectively are encountered. Finally, relatively narrow end portions designated at 168 and 170 form the trailing ends of the aperture defining openings 56 and 58. As previously noted, when the shutter blades 24 and 26 are displaced relative to each other, the blade end portions 50 and 52 which carry openings 56 and 58 bring these openings into coincidence. As the blades are displaced to bring the apertures into coincidence, the leading end portions 152 and 154 initially overlap to provide a relatively small photocell aperture whose area, while increasing with shutter movement, is not increased as rapidly as the progressive enlargement of the main aperture so that the two aperture curves tend to move closer to each other as shown in FIG. 6 and the lead time is reduced as shown in FIG. 7. This small photocell aperture is maintained during movement of the shutter blades until the step-like portions 156 and 158 of the openings 56 and 58 begin to overlap. This overlap of the step areas 156 and 158 correspond to the knee 150 in the photocell aperture curve as shown in FIG. 6 and the knee 134 in FIG. 7. As movement of the blades continues toward a full opening position, the photocell area becomes more rapidly enlarged to again increase the lead and the comparitive size of the two apertures. Even though the openings are stepped down at the intermediate portions 160 and 162, the photocell aperture continues to increase because of increasing length of the openings 56 and 58 now in an overlying arrangement. As the set displacement of blades 24 and 26 is continued, to further open the apertures, the widest portion 164 and 166 of each of the openings 56 and 58 comes into overlying relation with the step portions 156 and 158 to provide a further increase in the aperture area. Finally, as previously explained with regard to the ambient mode operation, when the blades are displaced to their final position, the leading end portions 152 and 154 of each blade overlap the corresponding trailing end portions 168 and 170 of the other blade so as to provide a slight decrease in the aperture opening from its maximum and actually determine the normalized area for the photocell aperture. In this way, the area of the photocell aperture is uniquely varied with respect to the main aperture during substantially linear travel of the shutter blades 24 and 26. Of course, it should be understood that when utilized in the flash mode, the shutter blades are driven to a selected position in accordance with the selected subject distance provided by the follow-focus mechanism. Hence, in the flash mode, a uniquely related main aperture and photocell aperture are chosen for each selected subject distance to provide an optimized photograph.

It should be understood that this invention may be practiced or embodied in still other ways without departing from the spirit of essential character thereof. Hence, the illustrated embodiment herein is illustrative and not restrictive, the scope of the invention being indicated by the appended claims and all variations which come within the meaning of the claims are intended to be embraced therein.

What is claimed is:

1. A photographic exposure control system for exposing, during a given flash illumination interval, photographic film located at a given film plane, said system comprising a variable lens assembly for directing image carrying rays from a scene along a given exposure path and for focusing such rays on such photographic material, and control means for controlling the instantaneous amount of light rays passing from such scene along such exposure path during an exposure cycle and for defining a related time interval during which such instantaneous amount of light is passed along such exposure path so as to provide an exposure interval and thereby determine the total amount of light passed to such film during such exposure cycle and, in response to focusing of said lens assembly, for determining a unique relationship between said instantaneous defining means and said exposure time interval defining means so as to provide an optimized exposure at selected subject distances, such relationship being varied at an intermediate subject distance so as to provide an exposure interval utilizing almost all of the flash interval and greater than the amount of flash interval utilized at focus settings for subject distances at least slightly less than or slightly greater than such intermediate distance so as to preclude over exposure of subjects at this intermediate distance.

2. The system of claim 1 for use also under ambient illumination, and wherein said means for defining a related time interval includes means for sensing the brightness of such scene, said brightness sensing being configured for leading said instantaneous light controlling means so as to anticipate the total amount of light passed along such path when said system is operated under ambient conditions, and said relationship determining means includes means for reducing said leading of said light sensitive means so as to reduce such anticipation of such scene brightness at intermediate focus distances and to thereby provide an exposure time interval utilizing a substantial portion of such flash interval.

3. The system of claim 1 for use also under ambient illumination, and wherein said means for defining a related time interval includes means for sensing the brightness of such scene, and said control means including means for varying said instantaneous light controlling means from a minimum to a maximum value and for simultaneously controlling the response of said brightness sensing means from a minimum to a maximum value which leads said instaneous light controlling means and then to reduced value so as to anticipate the total amount of light passed along such path in ambient operation as said instantaneous light controlling means is driven to its maximum and for then providing a reduced response to said brightness sensing means when said instantaneous light sensing means is maintained at its said maximum.

4. The system of claim 3 wherein said relationship determining is selectively operable, and additionally including means for rending said relationship determining means operative for flash mode operation.

5. The system of claim 1 wherein said control means includes a cam mechanism coupled to said focusing lens and operable therewith a first cam surface for near the intermediate subject distances and a second cam surface for further subject distances, selectively operable means for blocking and unblocking said exposure path and for defining a primary aperture for controlling light rays passing along said exposure path and means responsive to scene brightness for actuating said blocking and unblocking means to block said path following the unblocking thereof so as to terminate an exposure cycle, and said aperture defining means and said scene brightness responsive means being coupled to said cam mechanism and controlled thereby so as to provide a first aperture curve and scene brightness response curve for near to intermediate distances and a different curve for intermediate to further distances.

6. The system of claim 5 wherein said cam mechanism includes a third camm surface corresponding to focusing at far distances, said first cam surface providing only slight increase in said aperture size and said brightness response as said focus setting is varied from near to intermediate distances, said second cam surface providing a relatively large increase in said aperture size and said brightness response as said focus setting is varied from intermediate to further distances, and said third cam surface providing a relatively small increase in said aperture size and said brightness response as said focus setting is varied from said further to far distances.

7. A photographic exposure control system for exposing, under ambient or flash illuminatin, photographic material located at a given film plane, said system comprising a housing, an opening in said housing defining a maximum main aperture, a variable lens system for directing image carrying rays along a given exposure path from a scene through said housing opening and for focusing such rays on such photographic material, shutter means for blocking and unblocking said exposure path, means responsive to scene light for actuating said shutter means to block said path following the unblocking of said path, said shutter means including a pair of blade members mounted for displacement with respect to each other, each of said blade members having a primary and secondary opening which when displaced into at least partial coincidence with the corresponding opening of the other blade member respectively define a primary aperture for unblocking said exposure path and a secondary aperture for blocking said light responsive means, said primary opening being of larger size than said housing opening and being elongated in the direction of travel of said blade members so as to provide a substantially constant exposure opening at one point in displacement of said blade members while said secondary openings continue to provide an altered secondary aperture such that said secondary aperture may be varied while said main aperture is fully open.

8. A photographic exposure control system for exposing with flash illumination photographic material located at a given film plane, said system comprising a variable lens system for directing image carrying rays along a given exposure path from a scene and focusing such rays on such material, selectively operable shutter means for blocking and unblocking such exposure path, means for actuating said shutter means to unblock said path so as to initiate an exposure cycle, a light sensitive element configured for automatically actuating said shutter means to block said exposure path responsive to the brightness of such scene following initiation of an exposure cycle, said shutter means including means for determining a primary aperture opening of given size within a given range for control of the instantaneous amount of light passed to such film and for determining a secondary aperture opening of given size within a given range for control of the instantaneous amount of scene light emitted to said light sensitive element, follow-focus means responsive to selected focusing of said lens for selecting a given size of said main and said secondary apertures, said follow-focus means including means for determining said apertures over a first range of values for near to intermediate subject distances and a second range of values for intermediate to far subject distances.

9. A photographic exposure control system for exposing under ambient or flash illumination photographic material located at a given film plane, said system comprising a variable lens arrangement for directing image carrying rays along a given exposure path from a scene and for focusing such rays on such film material, selectively operable shutter means for blocking and unblocking such exposure path, means for actuating said shutter means to unblock said exposure path and thereby initiate an exposure cycle, means responsive to scene brightness for automatically actuating said shutter means to block said path following the initiation of such exposure cycle so as to terminate said exposure cycle and thereby determine an exposure interval, said shutter means including means for determining a main shutter aperture for controlling the instantaneous amount of light passing to such film plane and a secondary shutter aperture for controlling the instantaneous amount of scene light passing to said brightness responsive means, said shutter means including means for opening said secondary aperture at a relatively faster rate than the opening of said main aperture such that said secondary aperture leads said main aperture so as to provide an anticipation of scene brightness for ambient operations and said shutter means including means for decreasing such lead of such secondary aperture at intermediate aperture sizes so as to provide reduced anticipation of the scene brightness thereat and a sufficiently long exposure time at intermediate subject distances when operated in the flash mode to thereby utilize a large portion of the flash envelope at such distances.

10. The system of claim 9 wherein said lead of said secondary aperture over said main aperture is rapidly decreased at said intermediate subject distance settings and then rapidly increased as said shutter means is operated to progressively open said apertures so as to thereby provide suitable lead throughout most the shutter opening curve for ambient operation while providing reduced lead at intermediate subject distances in flash operation.

11. The system of claim 9 wherein said shutter means includes a pair of displaceable mounted blade members having a first pair of openings for defining said primary aperture and a second pair of openings for defining said secondary aperture, said second openings including elongated, narrow leading portions of substantially uniform width for providing an initial small increase in aperture size with blade displacement and second portions providing an abrupt increase in width for providing a rapid increase in aperture size with further blade displacement.

12. A photographic exposure control system for exposing, under ambient or flash illumination, photographic film material located at a given film plane, said system comprising a lens for directing light from a scene along a given exposure path to such film material, means for sensing the brightness of such scene, means for unblocking and thereafter blocking said exposure path and said brightness sensing means, means for actuating said unblocking and blocking means to unblock said path to thereby initiate an exposure cycle, and means responsive to said brightness sensing means for actuating said unblocking and blocking means to block said exposure path following the initiation of said exposure cycle to terminate said exposure cycle and thereby define an exposure interval, said unblocking and blocking means including means for controlling the instantaneous amounts of light passed from such scene along said exposure path and to said brightness sensing means from minimum to maximum values during unblocking of said exposure path with the instantaneous amount of light passed to said brightness sensing means in leading relation to that directed along said exposure path so as to provide anticipation of scene brightness, said blocking and unblocking means including means for maintaining the instantaneous amount of light passed from such scene along said exposure path at a maximum value while reducing the instantaneous amount of light passed from such scene to said brightness sensing means from a maximum to a lesser value so as to thereby provide a reduced response of said brightness sensing means.

13. A photographic exposure control system for exposing, under ambient or flash illumination, photographic material located at a given film plane, said system comprising a housing, an opening in said housing defining a maximum main aperture, a lens system for directing image carrying rays along a given exposure path from a scene through said housing opening and for focusing such rays on such photographic material, means for unblocking and blocking said exposure path, means for actuating said unblocking and blocking means to unblock said exposure path and thereby initiate an exposure cycle, means responsive to scene light for actuating said unblocking and blocking means to block said path following the unblocking thereof so as to terminate said cycle, said unblocking and blocking means including a pair of blade members mounted for displacement with respect to each other, each of said blade members having a primary and secondary opening which when displaced into at least partial coincidence with the corresponding opening of the other blade member respectively define a primary aperture for unblocking said exposure path and a secondary aperture for unblocking said light responsive means, said primary openings of said blade members being elongated in the direction of travel of said blade members and at least of larger size than said housing opening as measured in said direction so as to provide a substantially constant maximum exposure opening at one point in displacement of said blade members while said secondary openings continue to provide an altered secondary aperture such that said secondary aperture may be varied while said main aperture is fully open.

14. The system of claim 13 wherein said secondary openings in said blade members are configured to provide a reduction in the size of said secondary aperture as said blade members are displaced through said one point providing a maximum exposure opening so as to thereby reduce the response of said light responsive means when said maximum exposure opening is achieved.

15. The system of claim 13 wherein said blade openings are configured to provide, during blade displacement of said corresponding openings into coincidence, a leading relation of said secondary aperture to said primary aperture until said one point in displacement is reached and a reduction in said secondary aperture as said blade members are displaced through said one point so as to reduce the response of said light responsive means when said maximum exposure opening is achieved.

16. A photographic exposure control system for a camera for exposing photographic film under artificial illumination of given intensity during a given artificial illumination interval, the camera having means for mounting the photographic film at a focal plane, means defining a optical path along which image carrying light rays from a scene are directed to the camera focal plane, and means indicative of subject distance, said system comprising means responsive to the subject distance indicating means for limiting the instantaneous amount of light rays passing from the scene along the optical path during an exposure cycle as a function of subject distance, and means reponsive to scene light for defining a time interval during which the instantaneous amount of light is passed along the optical path so as to define an exposure interval as a function of scene brightness, said light ray limiting means and said exposure time interval defining means being interrelated in a predetermined manner to provide an exposure interval at a predetermined subject distance utilizing a portion of the given illumination interval greater than the portion of the illumination interval utilized by the exposure interval at a subject distance slightly greater than such predetermined distance to preclude overexposure of subjects at this predetermined distance.

17. The system of claim 16 wherein the portion of the illumination interval utilized at said predetermined subject distance is also greater than the portion of the illumination interval utilized at a subject distance slightly less than said predetermined distance.

18. The system of claim 16 wherein the camera includes a variable lens assembly and means for varying said lens assembly in accordance with subject distance so as to focus scene light rays on the camera focal plane, said limiting means includes means for defining an aperture of variable size located in the optical path, cam means operatively coupled to the lens varying means and having a cam surface displaceable in response to focusing of the lens assembly, and means for coupling said aperture defining means in cam follower relation to said cam surface and for controlling said aperture defining means to select an aperture size in accordance with lens focusing, said cam surface including an offset portion corresponding to said predetermined subject distance so as to select a given aperture size configured for utilizing said greater portion of the illumination interval at said predetermined subject distance for proper exposure.

19. The system of claim 16 for use under both ambient and artificial illumination wherein said exposure interval defining means includes means for sensing the brightness of the scene, and said limiting means includes means operable upon initiation of an exposure cycle for defining a variable aperture of progressively increasing size located in the optical path and for varying said sensing means in tracking relation to the size of said variable aperture to provide a light sensing response proportional to scene brightness and said aperture size in an ambient illumination mode of operation and means operable in an artificial illumination mode and responsive to the subject distance indicating means for controlling said aperture defining means to select an aperture size as a function of the subject distance indication, and said tracking relation being altered at a given aperture size functionally related to said predetermined subject distance so as to reduce the response of said sensing means at said given aperture size thereby increasing the exposure interval at said predermined subject distance so as to utilize said greater portion of the illumination interval at said predetermined subject distance in the artificial illumination mode.

20. The system of claim 19 wherein the camera includes a variable lens assembly and means for varying said lens assembly in accordance with subject distance to focus scene light rays on the camera focal plane, and said limiting means includes cam means operatively coupled to the lens varying means and having a cam surface displaceable inresponse to focusing of said lens assembly, and means for coupling said aperture defining means in cam follower relation to said cam surface and for controlling said aperture defining means to select an aperture size in accordance with lens focusing, and said cam surface having an offset portion therein corresponding to said predetermined subject distance so as to select a given aperture size configured for utilizing said greater portion of the illumination interval at said predetermined subject distance for proper exposure.

21. A photographic exposure control system for use with a camera for exposing photographic film under ambient illumination or under artificial illumination and responsive in an artificial illumination mode to both scene brightness and subject distance, the camera having means for mounting the photographic film at a focal plane, a lens for directing light from a scene along a given optical path to the film plane, and means for determining subject distance, said system comprising means for sensing the brightness of the scene, means for unblocking and thereafter blocking the given optical path, means for actuating said unblocking and blocking means to unblock the given optical path to thereby initiate an exposure cycle, and means responsive to said brightness sensing means for actuating said unblocking and blocking means to block the given optical path following the initiation of said exposure cycle so as to terminate said exposure cycle and thereby define an exposure interval, said unblocking and blocking means including means for simultaneously limiting the instantaneous amounts of scene light passed along the optical path and to said brightness sensing means from minimum to maximum values during unblocking of the given optical path with the instantaneous amount of scene light passed to said brightness sensing means in leading relation to the amount passed along the given optical path so as to thereby provide anticipation of scene brightness, means operative in the artificial illumination mode and responsive to the subject distance determining means for controlling said blocking and unblocking means so as to provide a limiting of selected value between said minimum and maximum values as a function of subject distance, and said blocking and unblocking means additionally including means for maintaining the limiting of the instantaneous amount of scene light passed along the given optical path at its maximum value while decreasing the limiting of the instantaneous amount of scene light passed to said brightness sensing means from a maximum to a lesser value so as to thereby provide a reduced response of said brightness sensing means for ambient mode operation.

* * * * *

UNITED STATES PATENT OFFICE
CERTIFICATE OF CORRECTION

Patent No. 3,896,458    Dated July 22, 1975

Inventor(s) Bruce K. Johnson and George D. Whiteside

It is certified that error appears in the above-identified patent and that said Letters Patent are hereby corrected as shown below:

Column 1, line 33, (appl. page 1, line 28), "aperute" should be --aperture--.

Column 1, line 34 (appl. page 1, line 30), "photgraphed" should be --photographed--.

Column 1, line 47 (appl. page 2, line 9), "sutiable" should be --suitable--.

Column 2, line 8, "emitted" should be --admitted--.

Column 2, line 13, "emits" should be --admits--.

Column 3, line 40 (appl. page 6, line 8), "an" should be --and--.

Column 3, line 65 (appl. page 7, line 2), "wit" should be --with--.

Column 4, line 6 (appl. page 7, line 11), "apertures" should be --aperture--.

Column 5, line 3 (appl. page 9, line 14), after "track" insert --82--.

Column 6, lines 20 and 21 (appl. page 12, line 7), "arrangemnt" should be --arrangement--.

Column 6, lines 36 and 37 (appl. page 12, line 23), "exposrue" should be --exposure--.

UNITED STATES PATENT OFFICE
CERTIFICATE OF CORRECTION

Patent No. 3,896,458    Dated July 22, 1975

Inventor(s) Bruce K. Johnson and George D. Whiteside

It is certified that error appears in the above-identified patent and that said Letters Patent are hereby corrected as shown below:

Column 6, line 66 (appl. page 13, line 22), "likewsie" should be --likewise--.

Column 6, line 66 (appl. page 13, line 22), "on" should be --or--.

Column 7, line 45 (appl. page 15, line 8), "open" should be --opening--.

Column 7, line 50 (appl. page 15, line 13), "than" should be --then--.

Column 9, line 4 (appl. page 18, line 10), "to" should be --of--.

Column 10, line 27 (appl. page 21, line 9), "encounter" should be --encountered--.

Column 10, line 66 (appl. page 22, line 16), "vaired" should be --varied--.

Column 11, line 10 (appl. page 22, line 28), "to" should be --too--.

Column 13, line 34 (appl. page 28, line 3), "opening" should be --open--.

Column 13, line 67 (appl. page 29, line 5), "of" should be --or--.

Column 14, line 65 (appl. page 31, claim 4, line 3), "rending" should be --rendering--.

UNITED STATES PATENT OFFICE
CERTIFICATE OF CORRECTION

Patent No. 3,896,458      Dated July 22, 1975

Inventor(s) Bruce K. Johnson and George D. Whiteside

It is certified that error appears in the above-identified patent and that said Letters Patent are hereby corrected as shown below:

Column 15, line 1 (appl. page 31, claim 5, line 3), after "therewith" insert --to provide--.

Column 15, line 2 (appl. page 32, claim 5, line 4), "the" should be --to--.

Column 15, line 17 (appl. page 32, claim 6, line 2), "camm" should be --cam--.

Column 15, line 30 (appl. page 32, claim 7, line 2), "illuminatin" should be --illumination--.

Column 15, line 47 (appl. page 33, claim 7, line 17), "blocking" should be --unblocking--.

Signed and Sealed this

Seventh Day of September 1976

[SEAL]

Attest:

RUTH C. MASON
*Attesting Officer*

C. MARSHALL DANN
*Commissioner of Patents and Trademarks*